US012804592B2

(12) United States Patent
Yu et al.

(10) Patent No.: US 12,804,592 B2
(45) Date of Patent: Nov. 17, 2026

(54) TIMING MEASUREMENT DATA-BASED POSITIONING METHOD AND DEVICE HAVING MINIMIZED NUMBER OF SCANS

(71) Applicant: KOREA RAILROAD RESEARCH INSTITUTE, Uiwang-si (KR)

(72) Inventors: Seung Min Yu, Hwaseong-si (KR); Jun Lee, Hwaseong-si (KR); So Young You, Cheonan-si (KR); Sang Pil Ko, Suwon-si (KR); Eun Bi Jeong, Ansan-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 908 days.

(21) Appl. No.: 18/042,031

(22) PCT Filed: Jun. 2, 2021

(86) PCT No.: PCT/KR2021/006844
§ 371 (c)(1),
(2) Date: Feb. 17, 2023

(87) PCT Pub. No.: WO2022/039355
PCT Pub. Date: Feb. 24, 2022

(65) Prior Publication Data

US 2024/0276443 A1 Aug. 15, 2024

(30) Foreign Application Priority Data

Aug. 18, 2020 (KR) ........................ 10-2020-0103035

(51) Int. Cl.
*H04W 64/00* (2009.01)
*H04B 17/318* (2015.01)
*H04W 48/20* (2009.01)

(52) U.S. Cl.
CPC ........ *H04W 64/006* (2013.01); *H04B 17/328* (2023.05); *H04W 48/20* (2013.01)

(58) Field of Classification Search
CPC ... H04W 64/006; H04W 48/20; H04W 64/00; H04B 17/328; G01S 5/04; G01S 5/021;
(Continued)

(56) References Cited

U.S. PATENT DOCUMENTS 10,070,253 B2 9/2018 Kang
2005/0233748 A1* 10/2005 Robinson .............. G01S 5/0289
455/440
(Continued)

FOREIGN PATENT DOCUMENTS

KR 10-2016-0018891 A 2/2016
KR 10-1599986 B1 3/2016
(Continued)

OTHER PUBLICATIONS

International Search Report for PCT/KR2021/006844 dated Sep. 14, 2021.

*Primary Examiner* — Michael Y Mapa
(74) *Attorney, Agent, or Firm* — Sughrue Mion, PLLC

(57) ABSTRACT

A method and an apparatus for timing measurement based positioning to minimize the number of scans is provided. The positioning method for a terminal includes estimating a temporary location of the terminal; analyzing characteristics of obstacles between the temporary location of the terminal and peripheral access points (APs) based on a pre-stored map on which the peripheral APs and the obstacles are indicated; calculating distances between the temporary location of the terminal and the peripheral APs based on the map; selecting at least three peripheral APs from among the peripheral APs according to at least one of the distances or the obstacle characteristics; generating timing measurement data with the at least three peripheral APs using identifica-
(Continued)

tion information of the at least three peripheral APs; and estimating a current location of the terminal using the timing measurement data.

25 Claims, 7 Drawing Sheets

(58) Field of Classification Search
CPC ...... G01S 5/0215; G01S 5/0295; G01S 11/06; G01S 19/42
USPC ........................................................ 455/456.1
See application file for complete search history.

(56) References Cited

U.S. PATENT DOCUMENTS

| | | | | |
|---|---|---|---|---|
| 2009/0069029 | A1 * | 3/2009 | Guvenc | G01S 5/14 455/456.1 |
| 2009/0213009 | A1 * | 8/2009 | Ishiwatari | G01S 5/021 342/450 |
| 2016/0249315 | A1 * | 8/2016 | Venkatraman | H04W 64/00 |
| 2017/0188188 | A1 | 6/2017 | Kang | |

FOREIGN PATENT DOCUMENTS

| | | | |
|---|---|---|---|
| KR | 10-2017-0078116 | A | 7/2017 |
| KR | 10-1788464 | B1 | 10/2017 |
| KR | 10-1945417 | B1 | 2/2019 |

* cited by examiner

【FIG. 1】
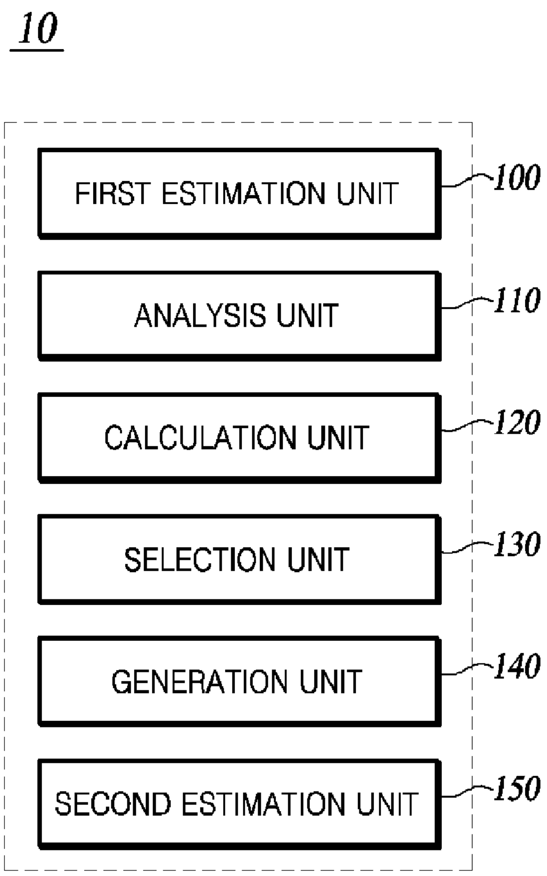

【FIG. 2】
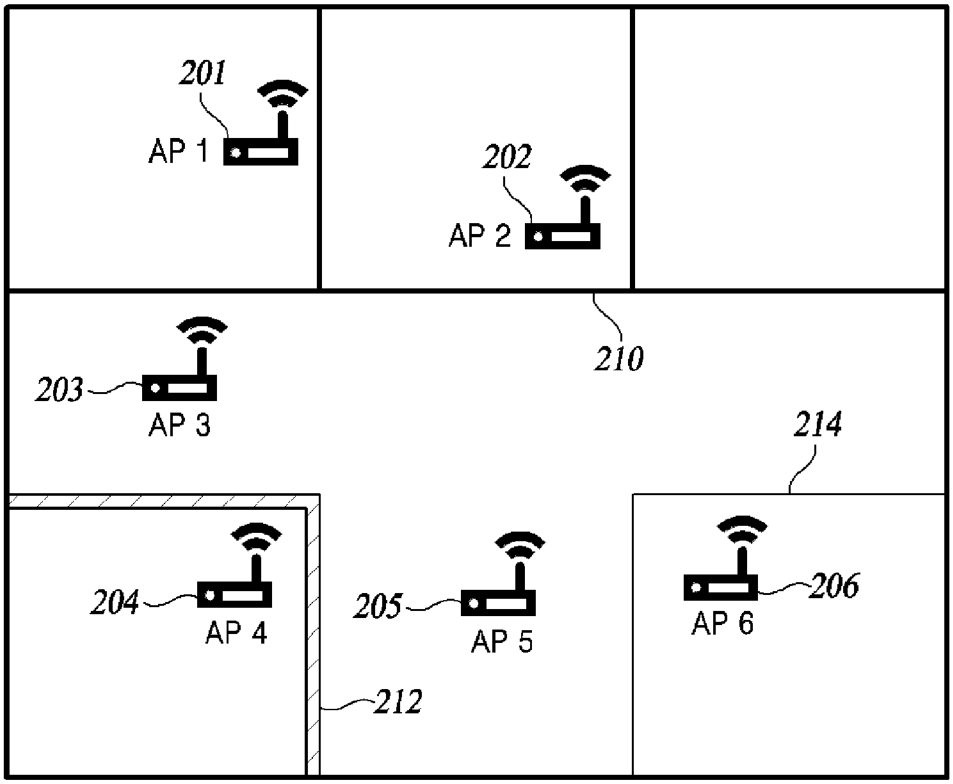

【FIG. 3a】
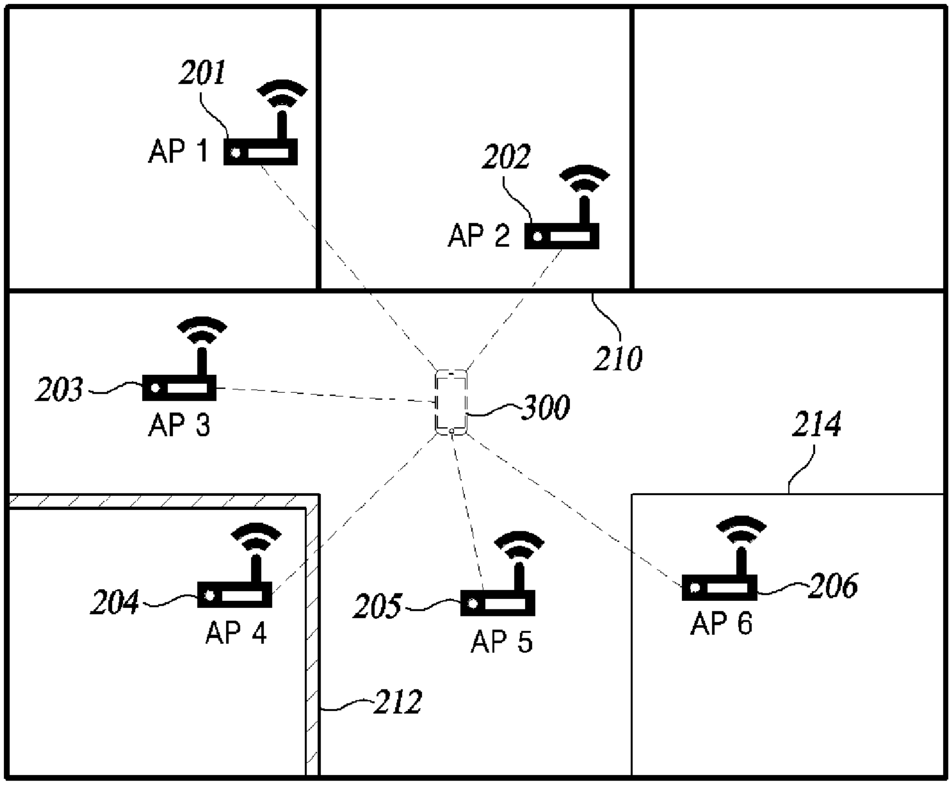

【FIG. 3b】
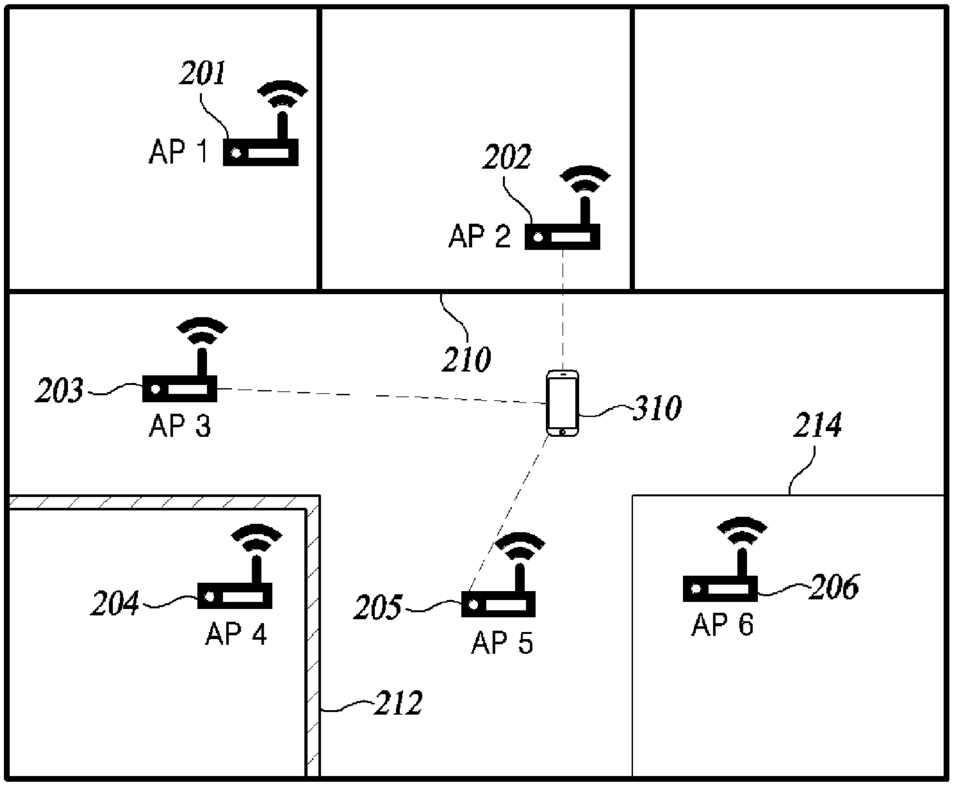

【FIG. 4a】
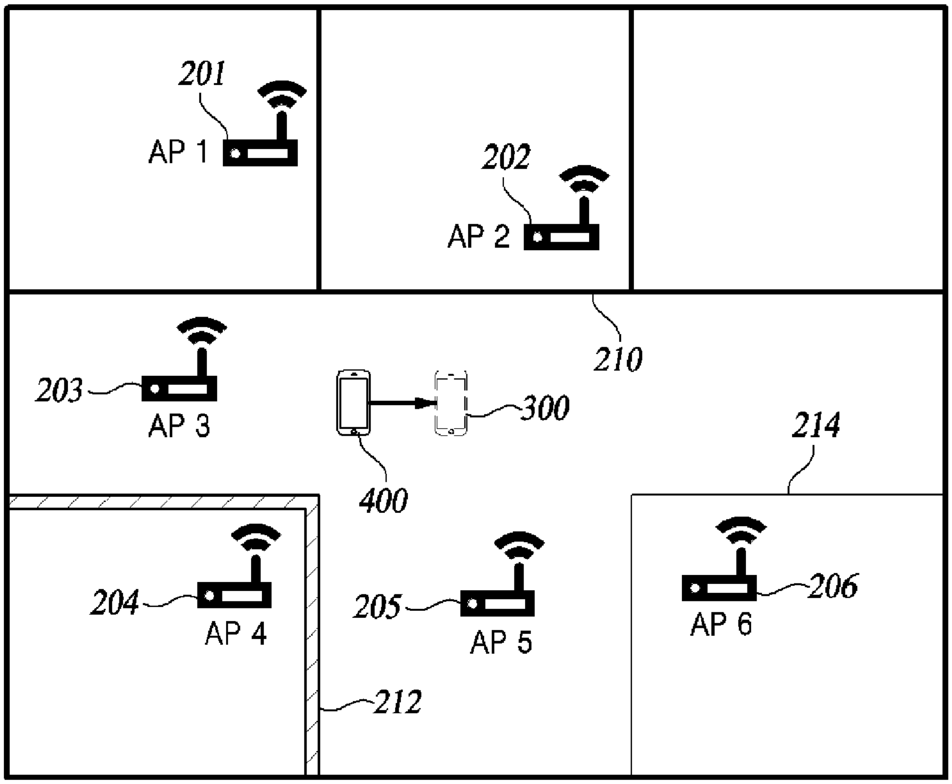

【FIG. 4b】
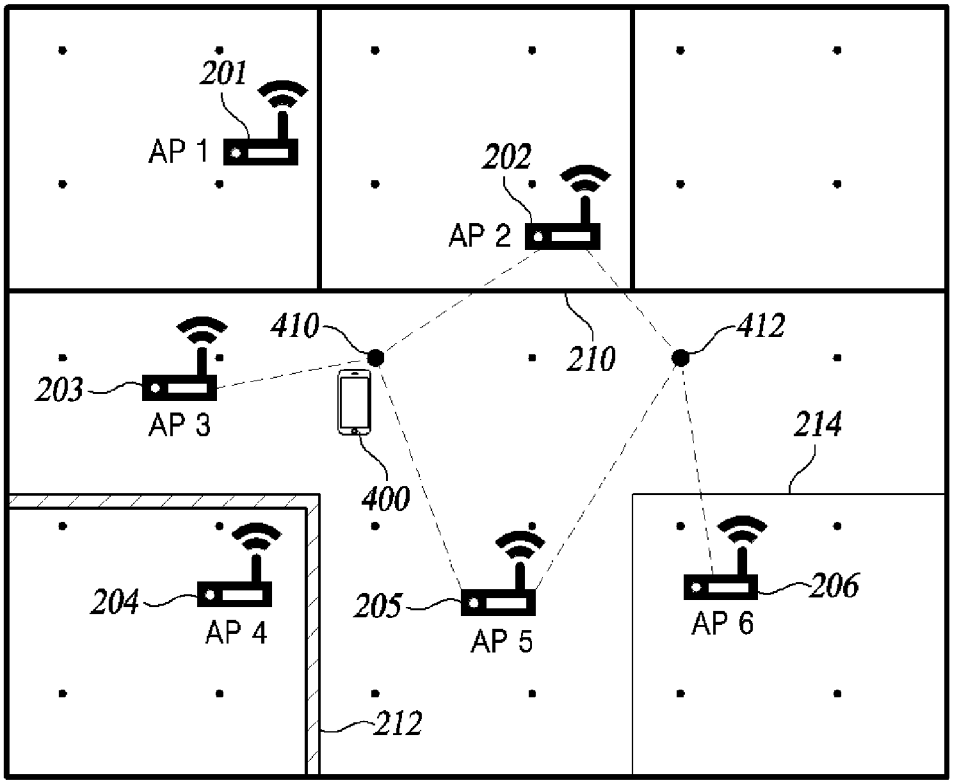

【FIG. 5】
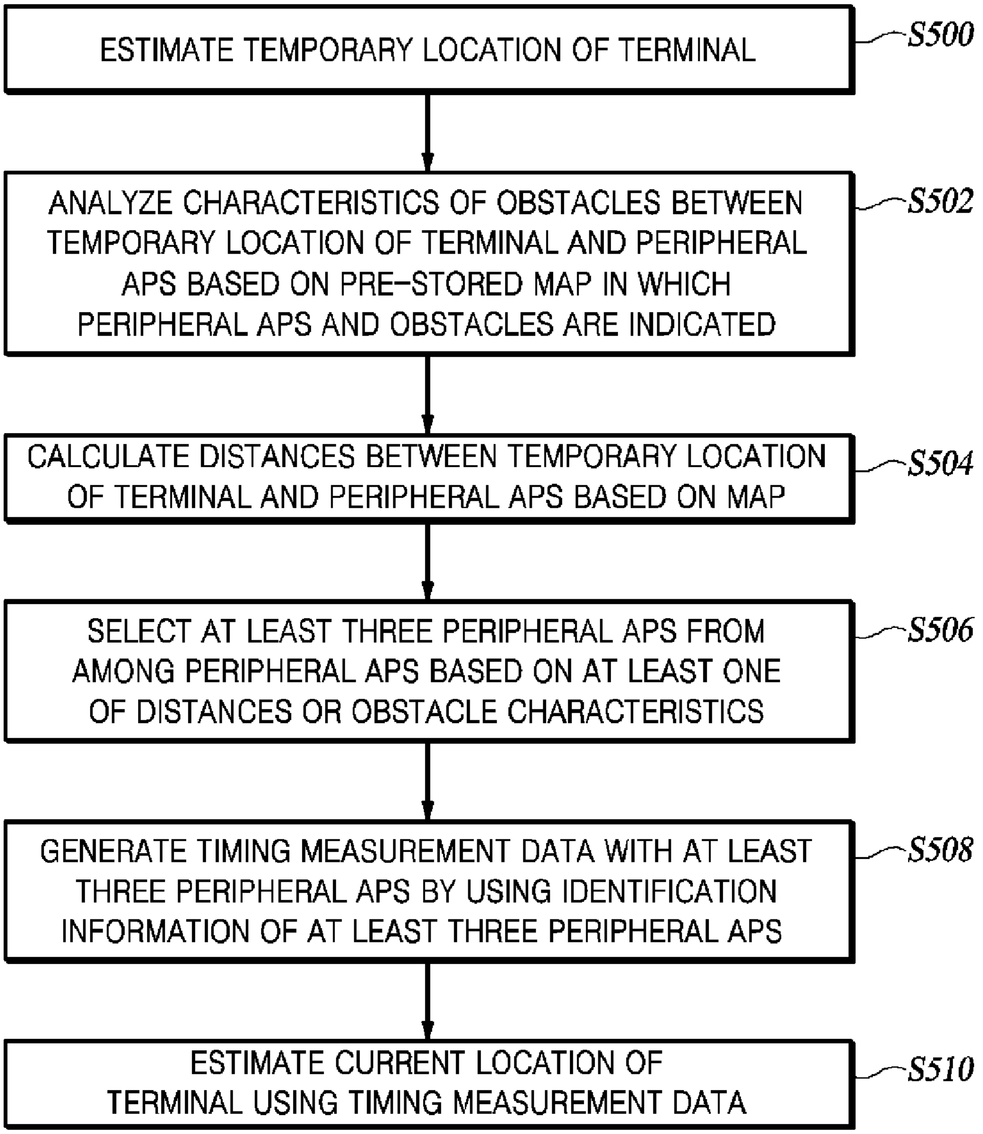

TIMING MEASUREMENT DATA-BASED POSITIONING METHOD AND DEVICE HAVING MINIMIZED NUMBER OF SCANS

CROSS REFERENCE TO RELATED APPLICATIONS

This application is a National Stage of International Application No. PCT/KR2021/006844 filed Jun. 2, 2021, claiming priority based on Korean Patent Application No. 10-2020-0103035 filed Aug. 18, 2020.

TECHNICAL FIELD

Embodiments of the present disclosure relate to a timing measurement data-based positioning method and apparatus for a terminal, and more particularly, to a timing measurement data-based positioning method and apparatus for a terminal capable of omitting a scan process for all access points (APs) while considering characteristics of obstacles between the terminal and the APs.

BACKGROUND ART

The contents described in this section simply provide background information on the present disclosure and do not constitute related art.

In order to provide the location of a terminal in a GPS signal shaded area such as indoors and underground, wireless communication-based positioning technology is being used more widely. Here, communication standards used in the LAN-based positioning technology include Bluetooth, Bluetooth at Low Energy (BLE), Ultra-Wideband (UWB), Wi-Fi, and the like.

In general, a positioning method based on wireless communication estimates a location of a terminal by applying a multilateration or fingerprint method to received signal strength indicator (RSSI) of a beacon signal. A representative method among indoor positioning methods using wireless signals is a method of estimating a location of a terminal by obtaining a distance between the terminal and each AP using signals received by the terminal from APs, and applying triangulation or multilateration to the AP-terminal distance.

Recently, research on wireless communication-based positioning technology has been actively conducted, and research on timing measurement data-based positioning methods in addition to RSSI-based positioning methods has also been actively conducted. The timing measurement data-based positioning method refers to a fine timing measurement (FTM) technology for estimating a location of a terminal by measuring the time a signal travels between the terminal and an AP, obtaining a distance from the measured time and propagation speed, and applying triangulation or multilateration to the AP-terminal distance.

A conventional timing measurement data-based positioning method performs a scan process and a sensing process. The scan process is a process in which a terminal receives beacon signals from all APs in the vicinity in order to determine which APs exist in the vicinity. The sensing process is a process of generating timing measurement data by selecting specific APs from among the scanned APs and exchanging signals with the selected APs. In the sensing process, APs are selected according to RSSI of the beacon signal, and the scan process needs to be performed.

However, in general, a terminal is manufactured to perform a scan process a predetermined number of times for a predetermined time period. For example, the terminal may be manufactured to perform a total of 4 scan processes in 2 minutes. This makes estimating the location of a moving terminal in real time using the timing measurement data-based positioning method difficult and may cause positioning error due to positioning delay.

Meanwhile, due to the nature of the wireless signal, when the signal strength changes according to various factors such as time, weather, or floating population, or when the wireless signal is distorted by multipath, non-line of sight (NLOS), or the like, there may be areas, in an indoor environment, where the accuracy of position measurement is low. Specifically, in the case of an indoor space, which is mostly an NLOS environment with no straight path between terminals, there is a high possibility that the distance measurement value and the final position estimation value contain errors.

Even in the timing measurement data-based positioning method, a positioning error may occur due to an obstacle between the terminal and the AP. For example, when there is a wall or other electronic device between the terminal and the AP, an error may occur in timing measurement data generated by the terminal using the AP. When estimating the location of the terminal using timing measurement data including an error, a positioning error may occur.

Accordingly, it is necessary to study a method for reducing the positioning delay due to the limited number of scans of the terminal and reducing the positioning error due to obstacles.

DISCLOSURE

Technical Problem

Embodiments of the present disclosure provide a positioning method and apparatus for a terminal for reducing the positioning delay and positioning error due to the limited number of scans of a terminal by minimizing the number of scans, which is prerequisite for a sensing process, and selecting APs with which to generate timing measurement data based on a pre-stored map.

Other embodiments of the present disclosure provide a positioning method and apparatus for reducing a positioning error caused due to signal distortion by considering not only distances between a terminal and APs but also obstacle characteristics, when selecting APs with which to generate timing measurement data based on a pre-stored map.

Technical Solution

An aspect of the present disclosure is directed to providing a positioning method for a terminal including estimating a temporary location of the terminal; analyzing characteristics of obstacles between the temporary location of the terminal and peripheral access points (APs) based on a pre-stored map on which the peripheral APs and the obstacles are indicated; calculating distances between the temporary location of the terminal and the peripheral APs based on the map; selecting at least three peripheral APs from among the peripheral APs according to at least one of the distances or the obstacle characteristics; generating timing measurement data with the at least three peripheral APs using identification information of the at least three peripheral APs; and estimating a current location of the terminal using the timing measurement data.

Another aspect of the present disclosure is directed to providing a positioning apparatus for a terminal including a first estimation unit configured to estimate a temporary location of the terminal; an analysis unit configured to analyze characteristics of obstacles between the temporary location of the terminal and peripheral access points (APs) based on a pre-stored map on which the peripheral APs and the obstacles are indicated; a calculation unit configured to calculate distances between the temporary location of the terminal and the peripheral APs based on the map; a selection unit configured to select at least three peripheral APs from among the peripheral APs according to at least one of the distances or the obstacle characteristics; a generation unit configured to generate timing measurement data with the at least three peripheral APs using identification information of the at least three peripheral APs; and a second estimation unit configured to estimate a current location of the terminal using the timing measurement data.

Advantageous Effects

As described above, according to one embodiment of the present disclosure, positioning delay and positioning error due to the limited number of scans of the terminal can be reduced by minimizing the number of scans, which is prerequisite for a sensing process, and selecting APs with which to generate timing measurement data based on a pre-stored map.

According to another embodiment of the present disclosure, positioning errors caused due to signal distortion can be reduced by considering not only the distances between the terminal and the APs but also obstacle characteristics when selecting APs with which to generate timing measurement data based on a pre-stored map.

BRIEF DESCRIPTION OF THE DRAWINGS

FIG. 1 is a configuration diagram illustrating components of a positioning apparatus according to one embodiment of the present disclosure.

FIG. 2 is a diagram illustrating a map according to one embodiment of the present disclosure.

FIG. 3A is a diagram illustrating a process of selecting an AP with which to generate timing measurement data according to one embodiment of the present disclosure.

FIG. 3B is a diagram illustrating a process of estimating a current location of a terminal through selected peripheral APs according to one embodiment of the present disclosure.

FIG. 4A is a diagram illustrating a process of estimating a location to which the terminal is expected to move as a temporary location according to one embodiment of the present disclosure.

FIG. 4B is a diagram illustrating a process of estimating a reference location as a temporary location according to one embodiment of the present disclosure.

FIG. 5 is a flowchart illustrating a positioning method for a terminal according to one embodiment of the present disclosure.

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Hereinafter, although a positioning apparatus for a terminal is described as being located inside the terminal, the positioning apparatus of the terminal may be the terminal itself or may be implemented as a server. When the positioning apparatus is implemented as a server, a positioning process may be performed by receiving timing measurement data generated by the terminal or an access point (AP).

FIG. 1 is a configuration diagram illustrating components of a positioning apparatus according to one embodiment of the present disclosure.

Referring to FIG. 1, a positioning apparatus 10 for a terminal includes a first estimation unit 100, an analysis unit 110, a calculation unit 120, a selection unit 130, a generation unit 140, and a second estimation unit 150.

The first estimation unit 100 is a component that estimates a temporary location of the terminal. Here, the temporary location of the terminal refers to a location used to select an AP with which to generate timing measurement data.

The first estimation unit 100 may determine whether there is information on a previous location of the terminal. The information on the previous location of the terminal means a location estimated by the second estimation unit 150 in a previous iteration of a timing measurement data-based positioning method, or means a location estimated by the first estimation unit 100 using a global navigation satellite system (GNSS) or received signal strength indicator (RSSI) of beacon signals. However, the present disclosure is not limited thereto, and includes all information available as the location of the terminal.

According to one embodiment of the present disclosure, when there is no information on the previous location of the terminal, the first estimation unit 100 may estimate the previous location of the terminal using GNSS or RSSI of beacon signals received from peripheral APs.

Specifically, the first estimation unit 100 receives beacon signals from all peripheral APs. Here, the beacon signal includes identification information of a plurality of peripheral devices, and the identification information includes one or more of a MAC address, a service set identifier (SSID), or identification information. Thereafter, the first estimation unit 100 may estimate the previous location of the terminal by applying a fingerprint method or a multilateration method to the RSSI of the beacon signals. In addition, the first estimation unit 100 may estimate the previous location of the terminal by receiving a satellite signal and applying GNSS. The first estimation unit 100 may determine the previous location of the terminal as the temporary location of the terminal.

According to another embodiment of the present disclosure, when there is information on the previous location of the terminal, the first estimation unit 100 may obtain one or more of the moving direction, speed, or step count of the terminal, and determine a location to which the terminal is expected to move from the previous location as the temporary location of the terminal based on one or more of the moving direction, speed, or step count of the terminal.

According to another embodiment of the present disclosure, the first estimation unit 100 may estimate the temporary location of the terminal using a reference point preset in a map. Specifically, the first estimation unit 100 sets a plurality of reference locations on the map. The first estimation unit 100 may determine a reference location closest to the previous location of the terminal among the plurality of reference locations as the temporary location of the terminal.

In order to set a plurality of reference locations, the first estimation unit 100 according to one embodiment of the present disclosure may set the plurality of reference locations by dividing the map at regular intervals. Preferably, the first estimation unit 100 may set reference locations at regular intervals in the case of a room or hall in which the terminal can move around freely.

According to another embodiment of the present disclosure, the first estimation unit 100 may set a plurality of reference locations on a path along which the terminal may move on the map. Here, the path along which the terminal may move may be an obstacle-free corridor. In this case, reference locations may be set only on paths along which the terminal may move, or more reference locations may be set on the path along which the terminal may move than a path along which the terminal may not move. In addition, a node may be set at an intersection of paths on the map, and a reference location may be set on a straight path between nodes.

The analysis unit 110 is a component that analyzes characteristics of obstacles between the temporary location of the terminal and the peripheral APs using a pre-stored map on which the peripheral APs and obstacles are indicated. Specifically, the analysis unit 110 may analyze one or more of the number or types of obstacles between the temporary location of the terminal and the peripheral APs. In this case, the types of obstacle mean all types of obstacles that can be indicated on the map.

The calculation unit 120 is a component that calculates distances between the temporary location of the terminal and the peripheral APs based on the map. The calculation unit 120 may calculate linear distances between location coordinates of the APs indicated on the map and the temporary location of the terminal.

The selection unit 130 is a component that selects, among the peripheral APs, at least three peripheral APs with which to generate timing measurement data according to at least one of the distances or obstacle characteristics. The selection unit 130 may select peripheral APs by simultaneously or sequentially considering the distances or obstacle characteristics.

According to one embodiment of the present disclosure, the selection unit 130 may calculate priority scores for the peripheral APs based on the distances or obstacle characteristics, and select APs with which to generate timing measurement data based on the priority scores. Specifically, the selection unit 130 calculates priority scores for peripheral APs based on the distances or obstacle characteristics. The selection unit 130 selects, among the peripheral APs, at least three peripheral APs having higher priority scores. In this case, the smaller the number of obstacles between the temporary location of the terminal and the peripheral APs and the shorter the distances are, the higher the priority score is calculated, and scores preset for the types of obstacles are calculated.

According to another embodiment of the present disclosure, the selection unit 130 may set a first priority order based on the obstacle characteristics, set a second priority order according to the distances between the terminal and the peripheral APs, and then select peripheral APs with which to generate timing measurement data. Specifically, the selection unit 130 determines the first priority order for the peripheral APs based on the obstacle characteristics. In this case, when four or more peripheral APs having the same first priority order exist, the selection unit 130 determines the second priority order for the four or more peripheral APs based on the distances to the terminal. The selection unit 130 may select at least three peripheral APs of which the first priority order and the second priority order are higher.

Conversely, the selection unit 130 may first determine the first priority order based on the distances, and when four or more peripheral APs having the same first priority order exist, may select at least three peripheral APs from among the four or more peripheral APs by taking into consideration the second priority order based on the obstacle characteristics.

According to another embodiment of the present disclosure, when the first estimation unit 100 sets the reference location, the selection unit 130 may select at least three peripheral APs preset for each reference location. The at least three peripheral APs for each reference location are preset according to at least one of the distances or obstacle characteristics. This will be described in detail with reference to FIG. 4B.

The generation unit 140 is a component that generates timing measurement data with at least three peripheral APs by using pre-stored identification information of the at least three peripheral APs. In this case, the timing measurement data refers to at least one of round trip time (RTT), time of flight (ToF), time of arrival (ToA), or time difference of arrival (TDoA). That is, timing measurement data may refer to all data of a distance measurement method based on timing measurement.

The second estimation unit 150 is a component that estimates a current location of the terminal using the timing measurement data. The second estimation unit 150 may estimate the current location of the terminal by applying a fingerprint method, triangulation, or multilateration to the timing measurement data generated for the selected at least three peripheral APs.

According to one embodiment of the present disclosure, the second estimation unit 150 may correct the timing measurement data using the obstacle characteristics. The second estimation unit 150 may estimate the current location of the terminal using the corrected timing measurement data. For example, the amount of distortion of a signal may be corrected based on the obstacle characteristics for each peripheral AP. When there is a wall having low signal transmittance between the terminal and the AP, the second estimation unit 150 may reduce the signal transmission time of the timing measurement data.

FIG. 2 is a diagram illustrating a map according to one embodiment of the present disclosure.

Referring to FIG. 2, a plurality of peripheral APs 201, 202, 203, 204, 205, and 206 and a plurality of obstacles 210, 212, and 214 are shown on the map. The plurality of peripheral APs 201, 202, 203, 204, 205, and 206 include a first peripheral AP 201, a second peripheral AP 202, a third peripheral AP 203, a fourth peripheral AP 204, a fifth peripheral AP 205 and a sixth peripheral AP 206. The plurality of obstacles 210, 212, and 214 include a first obstacle 210, a second obstacle 212 and a third obstacle 214.

Hereinafter, although all of the plurality of obstacles 210, 212, and 214 are described as a kind of wall, the present disclosure is not limited thereto and the plurality of obstacles may include any object capable of distorting a signal between a terminal and an AP. As one embodiment of the present disclosure, it will be described that the first obstacle 210 is a wooden wall, the second obstacle 212 is a concrete wall, and the third obstacle 214 is a glass wall. In this case, it is assumed that the signal transmittance of the glass wall is higher than that of the wooden wall.

The positioning apparatus according to one embodiment of the present disclosure may build and store a map in advance. The map includes identification information and location coordinates of the plurality of peripheral APs 201, 202, 203, 204, 205, and 206. In addition, the map includes information about the locations, shapes, types, and number of the plurality of obstacles 210, 212, and 214.

The positioning apparatus may update the map at preset intervals or may update the map according to a user's selection.

FIG. 3A is a diagram illustrating a process of selecting an AP with which to generate timing measurement data according to one embodiment of the present disclosure.

Referring to FIG. 3A, the plurality of peripheral APs 201, 202, 203, 204, 205, and 206, the plurality of obstacles 210, 212, and 214, and a temporary location 300 of the terminal are illustrated.

The positioning apparatus 10 estimates the temporary location 300 of the terminal. Specifically, the positioning apparatus 10 may estimate one of a previous location, a reference location, or a location to which the terminal has moved as the temporary location 300 of the terminal.

The positioning apparatus 10 analyzes the number and types of obstacles located between the temporary location 300 of the terminal and the plurality of peripheral APs 201, 202, 203, 204, 205, and 206. In FIG. 3A, there are two wooden walls between the temporary location 300 of the terminal and the first peripheral AP 201, and one wooden wall between the temporary location 300 of the terminal and the second peripheral AP 202. No obstacles associated with the third peripheral AP 203 and the fifth peripheral AP 205 exist. There is one concrete wall between the temporary location 300 of the terminal and the fourth peripheral AP 204, and there is one glass wall between the temporary location 300 of the terminal and the sixth peripheral AP 206.

Additionally, the positioning apparatus 10 calculates distances between the temporary location 300 of the terminal and the plurality of peripheral APs 201, 202, 203, 204, 205, and 206. In this case, the order of the process of analyzing obstacle characteristics and the process of calculating the distances by the positioning apparatus 10 may be switched.

The positioning apparatus 10 selects at least three peripheral APs from among the plurality of peripheral APs 201, 202, 203, 204, 205, and 206 according to at least one of the distance or the obstacle characteristics.

For example, the positioning apparatus 10 may select the third peripheral AP 203 and the fifth peripheral AP 205 with no obstacles to the temporary location 300 of the terminal. Additionally, since the third obstacle 214 is one glass wall, the positioning apparatus 10 may select the sixth peripheral AP 206.

As another example, the positioning apparatus 10 may select the third peripheral AP 203 and the fifth peripheral AP 205, and select the second peripheral AP 202 which is closer than the sixth peripheral AP 206.

According to one embodiment of the present disclosure, the positioning apparatus 10 may calculate priority scores for the plurality of peripheral APs 201, 202, 203, 204, 205, and 206. For example, the positioning apparatus 10 may calculate a high priority score for the fifth peripheral AP 205 that is close to the temporary location 300 of the terminal and free from obstacles. On the other hand, the positioning apparatus 10 may calculate a low priority score for the fourth peripheral AP 204 having a low signal transmittance even though the distance between the fourth peripheral AP 204 and the temporary location 300 of the terminal is short. In addition, the positioning apparatus 10 may calculate a low priority score for the first peripheral AP 201 that is far from the temporary location 300 of the terminal and has two obstacles. The positioning apparatus 10 selects at least three peripheral APs in order of priority scores, starting with the highest priority score.

According to another embodiment of the present disclosure, when there exist two or more peripheral APs that are free from obstacles in addition to the third peripheral AP 203 and the fifth peripheral AP 205, the positioning apparatus 10 may compare distances to the temporary location 300 of the terminal with respect to the peripheral APs that are free from obstacles. That is, the positioning apparatus 10 may select peripheral APs based on the obstacle characteristics and then compare the selected peripheral APs based on the distances. Conversely, the positioning apparatus 10 may select peripheral APs based on the distances and then compare the selected peripheral APs based on the obstacle characteristics.

Through the above-described processes, the positioning apparatus 10 can select peripheral APs with which to generate timing measurement data, and generate timing measurement data without scanning beacon signals from the plurality of peripheral APs 201, 202, 203, 204, 205, and 206.

FIG. 3B is a diagram illustrating a process of estimating a current location of a terminal through selected peripheral APs according to one embodiment of the present disclosure.

Referring to FIG. 3B, the plurality of peripheral APs 201, 202, 203, 204, 205, and 206, the plurality of obstacles 210, 212, and 214, and a current location 310 of the terminal are illustrated. In FIG. 3B, it is described that the positioning apparatus 10 has selected the second peripheral AP 202, the third peripheral AP 203, and the fifth peripheral AP 205.

The positioning apparatus 10 generates timing measurement data for the selected peripheral APs 202, 203, and 205 using pre-stored identification information of the selected peripheral APs 202, 203, and 205. That is, the positioning apparatus 10 performs a sensing process on the selected peripheral APs 202, 203, and 205. Then, the positioning apparatus 10 may derive distances to the selected peripheral APs 202, 203, and 205 from the signal transmission time and propagation speed included in the timing measurement data. The positioning apparatus 10 may estimate the current location 310 of the terminal by applying triangulation or multilateration to the distances to the selected peripheral APs 202, 203, and 205. In addition, the positioning apparatus 10 may estimate the current location 310 of the terminal through a fingerprint method.

According to one embodiment of the present disclosure, the positioning apparatus 10 may correct timing measurement data based on the obstacle characteristics. For example, referring to FIGS. 3A and 3B, since the first obstacle 210 of a wooden wall exists between the temporary location 300 of the terminal and the second peripheral AP 202, the positioning apparatus 10 may perform correction to reduce the signal transmission time measured for the second peripheral AP 202.

FIG. 4A is a diagram illustrating a process of estimating a location to which a terminal is expected to move as a temporary location according to one embodiment of the present disclosure.

Referring to FIG. 4A, the plurality of peripheral APs 201, 202, 203, 204, 205, and 206, the plurality of obstacles 210, 212, and 214, a temporary location 300 of the terminal and a previous location 400 of the terminal are shown.

The previous location 400 of the terminal may be a location of the terminal estimated by the positioning apparatus 10 in a previous iteration. In addition, the previous location 400 of the terminal may be a location estimated by the positioning apparatus 10 using GNSS. Further, the previous location 400 of the terminal may be a location estimated by the positioning apparatus 10 by scanning beacon signals from the plurality of peripheral APs 201, 202, 203, 204, 205, 206, and then applying multilateration or fingerprint to the RSSI of the beacon signals. The positioning apparatus 10 performs the scan process once only when there is no information about the previous location 400 of the terminal and when using the RSSI of the beacon signals.

According to one embodiment of the present disclosure, the positioning apparatus 10 may determine, as the temporary location 300 of the terminal, a location to which the terminal is expected to move from the previous location 400 of the terminal using an inertial measurement unit (IMU). The positioning apparatus 10 obtains one or more of a moving direction, speed, or step count of the terminal by using the IMU. The positioning apparatus 10 may estimate the temporary location 300 of the terminal based on one or more of the moving direction, speed, or step count.

According to another embodiment of the present disclosure, when the number of previous locations 400 of the terminal is plural, the positioning apparatus 10 may obtain one or more of the moving direction, speed, or step count of the terminal based on the distances between the previous locations and the time when each previous location was estimated. That is, the positioning apparatus 10 may estimate the temporary location 300 of the terminal using several previous locations of the terminal.

FIG. 4B is a diagram illustrating a process of estimating a reference location as a temporary location according to one embodiment of the present disclosure.

Referring to FIG. 4B, the plurality of peripheral APs 201, 202, 203, 204, 205, and 206, the plurality of obstacles 210, 212, and 214, the previous location 400 of the terminal, a first reference location 410, and a second reference location 412 are shown.

The positioning apparatus 10 may set a plurality of reference locations by dividing the map at regular intervals.

According to another embodiment of the present disclosure, when there is an area frequently estimated as locations of several terminals, more reference locations may be set within that area than reference locations outside the area. For example, when there is a movement path mainly used by people with terminals, many reference locations may be set on the movement path.

The positioning apparatus 10 may determine the first reference location 410, which is closest to the previous location 400 of the terminal, among a plurality of reference locations, as the temporary location of the terminal.

The positioning apparatus 10 may set three or more peripheral APs having a high priority score for each reference location and select the peripheral APs set for the reference location used as the temporary location of the terminal. For example, the positioning apparatus 10 may calculate and store priority scores for the plurality of peripheral APs 201, 202, 203, 204, 205, and 206 at the first reference location 410 in advance. The positioning apparatus 10 selects at least three peripheral APs according to the priority scores. In FIG. 4B, three peripheral APs having high priority scores at the first reference location 410 are the second peripheral AP 202, the third peripheral AP 203, and the fifth peripheral AP 205. At the second reference location 412, three peripheral APs having high priority scores are the second peripheral AP 202, the fifth peripheral AP 205, and the sixth peripheral AP 206.

The positioning apparatus 10 may generate timing measurement data with the second peripheral AP 202, the third peripheral AP 203, and the fifth peripheral AP 205 preset for the first reference location 410, and estimate a current location of the terminal using the timing measurement data.

FIG. 5 is a flowchart illustrating a positioning method for a terminal according to one embodiment of the present disclosure.

Referring to FIG. 5, the positioning apparatus estimates a temporary location of the terminal (S500). The positioning apparatus may estimate one of a previous location, a reference location, or a location to which the terminal is expected to move as the temporary location of the terminal.

The positioning apparatus analyzes characteristics of obstacles between the temporary location of the terminal and peripheral APs based on a pre-stored map on which the peripheral APs and the obstacles are indicated (S502). The obstacle characteristics include the number and types of obstacles.

The positioning apparatus calculates distances between the temporary location of the terminal and the peripheral APs based on the map (S504).

The positioning apparatus selects at least three peripheral APs from among the peripheral APs according to at least one of the distances or the obstacle characteristics (S506).

According to embodiments of the present disclosure, the positioning apparatus may calculate a priority score based on the obstacle characteristics or the distances between the temporary location of the terminal and the surrounding APs, and select at least three peripheral APs with high priority scores.

According to another embodiment of the present disclosure, the positioning apparatus may select at least three preset peripheral APs for each reference location.

The positioning apparatus generates timing measurement data with the at least three peripheral APs by using identification information on the at least three peripheral APs (S508).

The positioning apparatus estimates a current location of the terminal using the timing measurement data (S510). According to one embodiment of the present disclosure, the positioning apparatus may correct the timing measurement data based on the obstacle characteristics and estimate the current location of the terminal using the corrected timing measurement data.

Although it is described in FIG. 5 that the processes S500 to S510 are sequentially executed, this is merely illustrative of the technical idea of one embodiment of the present disclosure. In other words, since a person of ordinary skill in the art to which the embodiment of the present disclosure pertains may make various modifications and changes by changing the order of the processes described in FIG. 5 or performing one or more of the processes S500 to S510 in parallel without departing from the essential characteristics of the embodiment of the present disclosure, FIG. 5 is not limited to a time-series order.

Meanwhile, the processes shown in FIG. 5 can be implemented as computer readable codes on a computer-readable recording medium. The computer-readable recording medium includes all types of recording devices in which data readable by a computer system is stored. That is, the computer-readable recording medium may be a non-transitory medium such as ROM, RAM, CD-ROM, a magnetic tape, a floppy disk, or an optical data storage device, and may further include a temporary medium such as a carrier wave (e.g., transmission over the Internet) and a data transmission medium. In addition, the computer-readable recording medium may be distributed in a network-connected computer system, and computer-readable codes may be stored and executed in a distributed manner.

In addition, the components of the present disclosure may use an integrated circuit structure such as a memory, a processor, a logic circuit, a look-up table, and the like. The integrated circuit structures execute each of the functions described in the present specification through the control of one or more microprocessors or other control devices. Further, the components of the present disclosure may be specifically implemented by a part of a program or codes that include one or more executable instructions for performing a specific logical function and is executed by one or more microprocessors or other control devices. Furthermore, the components of the present disclosure may include or be implemented by a central processing unit (CPU), a microprocessor, etc. that perform each function. In addition, the components of the present disclosure may store instructions executed by one or more processors in one or more memories.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

CROSS-REFERENCE TO RELATED APPLICATION

This application claims priority to Patent Application No. 10-2020-0103035, filed on Aug. 18, 2020 in Korea, the entire contents of which are incorporated herein by reference.

The invention claimed is:

1. A positioning method for a terminal, the positioning method comprising:
   - estimating a temporary location of the terminal;
   - analyzing characteristics of obstacles between the temporary location of the terminal and peripheral access points (APs) based on a pre-stored map on which the peripheral APs and the obstacles are indicated;
   - calculating distances between the temporary location of the terminal and the peripheral APs based on the pre-stored map;
   - selecting at least three peripheral APs from among the peripheral APs according to at least one of the distances or the characteristics of the obstacles;
   - generating, subsequent to the selecting the at least three peripheral APs, timing measurement data with only the at least three peripheral APs, from among the peripheral APs, using identification information of the at least three peripheral APs, wherein the identification information identifies the at least three peripheral APs, and the identification information is pre-stored in the pre-stored map; and
   - estimating a current location of the terminal using the timing measurement data.

2. The positioning method of claim 1, wherein estimating the temporary location of the terminal includes:
   - obtaining at least one of a moving direction, a speed, or a step count of the terminal; and
   - determining a location to which the terminal has moved from a previous location as the temporary location of the terminal based on at least one of the moving direction, the speed, or the step count.

3. The positioning method of claim 1, wherein estimating the temporary location of the terminal includes:
   - setting a plurality of reference locations on the pre-stored map; and
   - determining, among the plurality of reference locations, a reference location closest to a previous location of the terminal as the temporary location of the terminal.

4. The positioning method of claim 3, wherein setting the plurality of reference locations includes setting the plurality of reference locations by dividing the pre-stored map at regular intervals.

5. The positioning method of claim 3, wherein setting the plurality of reference locations includes setting the plurality of reference locations on a path along which the terminal may move in the pre-stored map.

6. The positioning method of claim 3, wherein selecting the at least three peripheral APs includes selecting at least three peripheral APs preset for each reference location according to at least one of the distances or the characteristics of the obstacles.

7. The positioning method of claim 1, wherein estimating the temporary location of the terminal includes:
   - determining whether there is information about a previous location of the terminal;
   - determining the previous location of the terminal as the temporary location of the terminal when there is the information about the previous location of the terminal; and
   - when there is no information about the previous location of the terminal, estimating the previous location of the terminal using a global navigation satellite system (GNSS) or a received signal strength indicator (RSSI) of beacon signals received from the peripheral APs, and determining the previous location of the terminal as the temporary location of the terminal.

8. The positioning method of claim 1, wherein analyzing the characteristics of the obstacles includes analyzing at least one of a number or types of obstacles located between the temporary location of the terminal and the peripheral APs.

9. The positioning method of claim 8, wherein selecting the at least three peripheral APs includes:
   - calculating priority scores for the peripheral APs based on the distances or the characteristics of the obstacles; and
   - selecting at least three peripheral APs having higher priority scores among the peripheral APs.

10. The positioning method of claim 9, wherein the priority scores are calculated higher as the number of the obstacles between the temporary location of the terminal and the peripheral APs is smaller and the distances are shorter, and scores preset for types of the obstacles are calculated.

11. The positioning method of claim 1, wherein selecting the at least three peripheral APs includes:

determining a first priority order for the peripheral APs based on the characteristics of the obstacles;

when four or more peripheral APs having the same first priority order exist, determining a second priority order for the four or more peripheral APs according to distances to the terminal; and selecting at least three peripheral APs of which the first priority order and the second priority order are higher from among the peripheral APs.

12. The positioning method of claim 1, wherein estimating the current location of the terminal includes:

correcting the timing measurement data based on the characteristics of the obstacles; and estimating the current location of the terminal using the corrected timing measurement data.

13. The positioning method of claim 1, wherein the timing measurement data is at least one of round trip time (RTT), time of flight (ToF), time of arrival (ToA), or time difference of arrival (TDoA).

14. A positioning apparatus for a terminal, comprising:

a first estimation unit configured to estimate a temporary location of the terminal;

an analysis unit configured to analyze characteristics of obstacles between the temporary location of the terminal and peripheral access points (APs) based on a pre-stored map on which the peripheral APs and the obstacles are indicated;

a calculation unit configured to calculate distances between the temporary location of the terminal and the peripheral APs based on the pre-stored map;

a selection unit configured to select at least three peripheral APs from among the peripheral APs according to at least one of the distances or the characteristics of the obstacles;

a generation unit configured to generate, subsequent to the selection unit selecting the at least three peripheral APs, timing measurement data with only the at least three peripheral APs, from among the peripheral APs, using identification information of the at least three peripheral APs, wherein the identification information identifies the at least three peripheral APs, and the identification information is pre-stored in the pre-stored map; and a second estimation unit configured to estimate a current location of the terminal using the timing measurement data.

15. The positioning apparatus of claim 14, wherein the first estimation unit is configured to obtain at least one of a moving direction, a speed, or a step count of the terminal, and determine a location to which the terminal has moved from a previous location as the temporary location of the terminal based on at least one of the moving direction, the speed, or the step count.

16. The positioning apparatus of claim 14, wherein the first estimation unit is configured to set a plurality of reference locations on the pre-stored map, and determine, among the plurality of reference locations, a reference location closest to a previous location of the terminal as the temporary location of the terminal.

17. The positioning apparatus of claim 16, wherein the first estimation unit is configured to set the plurality of reference locations by dividing the pre-stored map at regular intervals.

18. The positioning apparatus of claim 16, wherein the first estimation unit is configured to set the plurality of reference locations on a path along which the terminal may move in the pre-stored map.

19. The positioning apparatus of claim 16, wherein the selection unit is configured to select at least three peripheral APs preset for each reference location according to at least one of the distances or the characteristics of the obstacles.

20. The positioning apparatus of claim 14, wherein the first estimation unit is configured to determine whether there is information about a previous location of the terminal, determine the previous location of the terminal as the temporary location of the terminal when there is the information about the previous location of the terminal, and when there is no information about the previous location of the terminal, estimate the previous location of the terminal using a global navigation satellite system (GNSS) or a received signal strength indicator (RSSI) of beacon signals received from the peripheral APs and determine the previous location of the terminal as the temporary location of the terminal.

21. The positioning apparatus of claim 14, wherein the analysis unit is configured to analyze at least one of types or a number of obstacles located between the temporary location of the terminal and the peripheral APs.

22. The positioning apparatus of claim 21, wherein the selection unit is configured to calculate priority scores for the peripheral APs based on the distances or the characteristics of the obstacles, and select at least three peripheral APs having higher priority scores among the peripheral APs.

23. The positioning apparatus of claim 22, wherein the priority scores are calculated higher as the number of obstacles between the temporary location of the terminal and the peripheral APs is smaller and the distances are shorter, and scores preset for types of the obstacles are calculated.

24. The positioning apparatus of claim 14, wherein the selection unit is configured to determine a first priority order for the peripheral APs based on the characteristics of the obstacles, determine, when four or more peripheral APs having the same first priority order exist, a second priority order for the four or more peripheral APs according to distances to the terminal, and select at least three peripheral APs of which the first priority order and the second priority order are higher from among the peripheral APs.

25. The positioning apparatus of claim 14, wherein the second estimation unit is configured to correct the timing measurement data based on the characteristics of the obstacles, and estimate the current location of the terminal using the corrected timing measurement data.

* * * * *